(12) United States Patent
DeCoursey et al.

(10) Patent No.: US 6,594,706 B1
(45) Date of Patent: Jul. 15, 2003

(54) METHOD FOR GLOBAL ROUTING OF ELECTRONIC MESSAGES BY ENCODING AN ORIGINATOR'S INDICA WITH IDENTIFICATION OF A CORRESPONDING SERVICE PROVIDER FROM STORED DATABASE IN A GATEWAY CONTROL CENTER

(75) Inventors: Mark Hamblin DeCoursey, Burke, VA (US); Valery Mikhail Feldman, Potomac, MD (US); Glenn Stephen Waleska, Warrenton, VA (US); Mark William Clark, McLean, VA (US)

(73) Assignee: Orbcomm LLC, Dulles, VA (US)

( * ) Notice: Subject to any disclaimer, the term of this patent is extended or adjusted under 35 U.S.C. 154(b) by 0 days.

(21) Appl. No.: 09/514,058

(22) Filed: Feb. 25, 2000

(51) Int. Cl.[7] .............................................. G06F 15/173
(52) U.S. Cl. ..................... 709/238; 709/206; 709/207; 709/217; 709/218; 709/219; 709/236; 709/244
(58) Field of Search ......................... 709/206, 217–219, 709/236, 238, 244, 207

(56) References Cited

U.S. PATENT DOCUMENTS

| | | | | |
|---|---|---|---|---|
| 5,493,564 A | * | 2/1996 | Mullan ........................ 370/351 |
| 5,742,668 A | * | 4/1998 | Pepe et al. ................... 455/415 |
| 5,884,246 A | * | 3/1999 | Boucher et al. ................ 704/2 |
| 5,920,697 A | * | 7/1999 | Masters et al. ............. 709/219 |
| 5,946,618 A | * | 8/1999 | Agre et al. .................. 455/428 |
| 5,968,117 A | * | 10/1999 | Schuetze ..................... 709/206 |
| 5,983,090 A | * | 11/1999 | Aoki .......................... 455/403 |
| 6,122,671 A | * | 9/2000 | Farrar, Jr. et al. .......... 709/238 |
| 6,148,329 A | * | 11/2000 | Meyer ......................... 709/206 |
| 6,151,629 A | * | 11/2000 | Trewitt ....................... 709/225 |
| 6,154,777 A | * | 11/2000 | Ebrahim ...................... 709/227 |
| 6,182,897 B1 | * | 2/2001 | Knowles et al. ........ 235/462.01 |
| 6,259,405 B1 | * | 7/2001 | Stewart et al. .............. 342/457 |

* cited by examiner

Primary Examiner—Nabil El-Hady
(74) Attorney, Agent, or Firm—Chadbourne & Parke, LLP (57) ABSTRACT

The present invention is a method for routing electronic messages over a telecommunications system containing both satellite and ground-based elements. The present invention routes messages based on the originator's address as well as the recipient's address. In this way, all messages sent to or from subscriber communicators provisioned by a given provisioning entity are handled at the provisioning entity's local equipment prior to final delivery.

26 Claims, 3 Drawing Sheets

METHOD FOR GLOBAL ROUTING OF ELECTRONIC MESSAGES BY ENCODING AN ORIGINATOR'S INDICA WITH IDENTIFICATION OF A CORRESPONDING SERVICE PROVIDER FROM STORED DATABASE IN A GATEWAY CONTROL CENTER

BACKGROUND OF THE INVENTION

The present invention relates to the routing of electronic messages over a telecommunications system containing both satellite and ground-based elements.

In a satellite communications system, an electronic message is sent from a Subscriber Communicator ("SC"), e.g., a ground-based communications transceiver, to the satellite covering the geographic region in which the SC is operating. Upon receiving the electronic message, the satellite transmits the electronic message to an appropriate Gateway Earth Station ("GES"). The GES receives the message and sends it to the system operator's Gateway Control Center ("GCC") for delivery to the recipient.

A SC-originated message is routed from the GCC to the recipient based on the recipient's address, similar to how letters are delivered by the post office. For example, the message might travel along a dedicated link from the GCC to a Value Added Reseller's ("VAR's") Message Transfer Agent (MTA), where services such as automated. language translation can be applied to the message. Then, the message is routed to the recipient across a public network. Alternatively, the message might travel along a public network from the GCC directly to the recipient. The public network link from the GCC to the recipient could be any one of the available public services, e.g., the Internet or a Plain Old Telephone System dial-up line.

A message sent to a SC generally may travel over any one of multiple routes from the originator to the GCC, including a public network route to a VAR's MTA or a public network route directly to the GCC. The route through the VAR's MTA to the GCC may include a dedicated link between the MTA and the GCC. When a message is received at the GCC, it is sent to the GES that is connected to the GCC. The GES transmits the message to the appropriate satellite, which transmits the message to the SC.

Service providers for the SCs typically are authorized to provide such service only for a geographically distinct area, e.g., a single country. In prior art systems, the service provider is required to have a GCC to control electronic communications originating or terminating within the service provider's coverage area. This is true even though a GCC is capable of handling the electronic communications for a large region, e.g., Western Europe, encompassing more than one service provider's authorized territory.

Using a single, regional GCC to control electronic message traffic for a large, multi-country region, i.e., "regionalization," is not presently feasible in some cases using prior art systems due to commercial and political concerns. The primary commercial concern is that regionalization reduces a service provider's control over messages sent to and from SCs provisioned by the service provider. Therefore, the service provider has limited ability to be compensated appropriately for messages originating from or terminating in the service provider's territory and involving the service provider's customers. Additionally, the service provider has limited ability to control the access granted to SCs (i.e., customers) provisioned by the service provider and to provide additional services such as language translation and billing services. Further, the legal requirements of many countries require a local (i.e. in-country) entity to control all electronic communications originating or terminating within the country.

SUMMARY OF THE INVENTION

The present invention overcomes the commercial and political roadblocks presently frustrating the use of regional GCCs by providing service providers with message routing capability for all messages to or from SCs provisioned by the service provider without requiring any GCC to be dedicated to only a single service provider.

The present invention allows a service provider to control and manage messages to and from the SCs provisioned by the service provider without having a dedicated GCC. The service provider can then provide, for example, the following services: customer billing; customer services tailored to the needs of a specific customer; statistical compilation and reporting of message traffic; and control over messages for regulatory purposes. The present invention provides these benefits at a significantly lower cost than the cost of a dedicated GCC. Additionally, the present invention provides greater routing control than MTA software insofar as the present invention provides dual method routing control, compared to the single method routing control provided by MTA software.

A MTA is a computer system that routes electronic mail according to the destination address. This routing determination is invisible to the sender and recipient. MTA software routes electronic messages according to the standards and specifications developed by and for the International Telecommunications Union, in particular the X.400 standards. Various companies have developed MTA software to implement the X.400 standards.

Messages to or from a SC are routed through a Message Distribution Center ("MDC") of the present invention operated by the service provider that provisioned the SC. The MDC routes messages based on either the originator's or the recipient's X.400 address depending on whether the message originates at a SC or terminates at a SC, respectively. Where a message is addressed in Simple Mail Transfer Protocol (SMTP) format, e.g., localpart@domain.com, the recipient's address is converted to X.400 format at the regional GCC. This routing method is similar to routing a letter through a particular post office based on the letter's return address.

All of the hardware and software components for the MDC, with the exception of the MDC Transfer Module ("MTM"), described below, are available as commercial, off-the-shelf products. The MDC hardware consists of a group of fault tolerant servers, routers, hubs, and uninterruptable power supplies. The MDC software includes commercial, off-the-shelf MTA and firewall software packages and a MTA equipped with Message Store functionality and a SMTP/MIME gateway (defined below).

The MTM is a software module that encapsulates and de-encapsulates a message that originated with a SC provisioned by a service provider operating a MDC. One software module is placed in the regional GCC and another is placed in the service provider's MDC. When a message that was sent from a SC provisioned by a service provider operating a MDC arrives at a regional GCC, the MTM software module in the GCC converts the recipient address so that the message will be routed to the service provider's MDC. When the message arrives at the MDC, the MTM software module on the MDC reverses the address conversion made at the GCC so that the message can be routed to the intended recipient via public networks.

The MDC is connected to the regional GCC via a dedicated frame relay link and a permanent virtual circuit. A dedicated frame relay link is a data link using the public telephone and telegraph systems to deliver switched, packetized data from the MDC to the GCC and vice-versa. A permanent virtual circuit is a logical connection through a frame relay network. A permanent virtual circuit is a logical connection through a frame relay network.

A second, back-up, connection from the MDC to the regional GCC is an Integrated Services Digital Network ("ISDN") Basic Rate Interference connection from the public switched telephone network. A tertiary method of connection, in case the primary and secondary methods fail, is an analog dial up connection using the public switched telephone network.

DETAILED DESCRIPTION OF THE PREFERRED EMBODIMENT

The present invention is a turnkey system for message routing including a complete platform to incorporate a service provider's business interests (e.g., billing and the provision of services such as language translation). The present invention enables a service provider to control messages sent to and from SCs provisioned by the service provider via a regional GCC. The MDC component is a standalone product that provides a local address for low earth orbiting satellite accessible subscriber communicators regardless of the actual path entailed in message transfer.

The present invention is based on the X.400 messaging system protocols. X.400 electronic mail transfer is a store-and-forward system; i.e., messages from the originator are sent from computer to computer in stages. Each computer in the routing path is absolved of responsibility for the message when the next computer receives it. By means of this successive responsibility for the message through a network of computers, the message is passed from the originator to the recipient(s), having been copied as necessary to satisfy branching delivery paths in the recipient list. Each computer in the system described above is a MTA.

Figure 1:
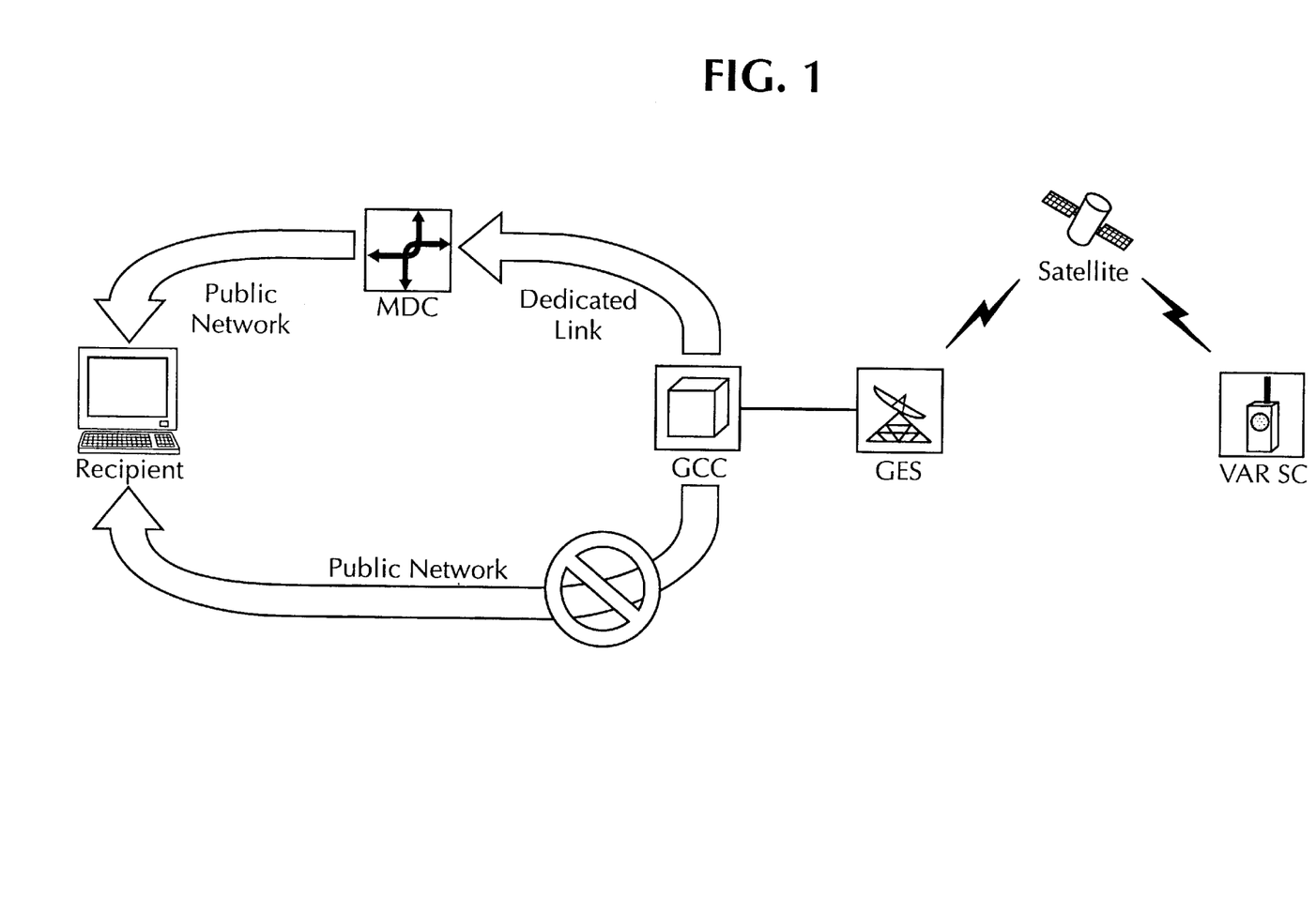
FIG. 1 is a diagrammatic representation of a satellite communications system including the present invention.
Figure 2:
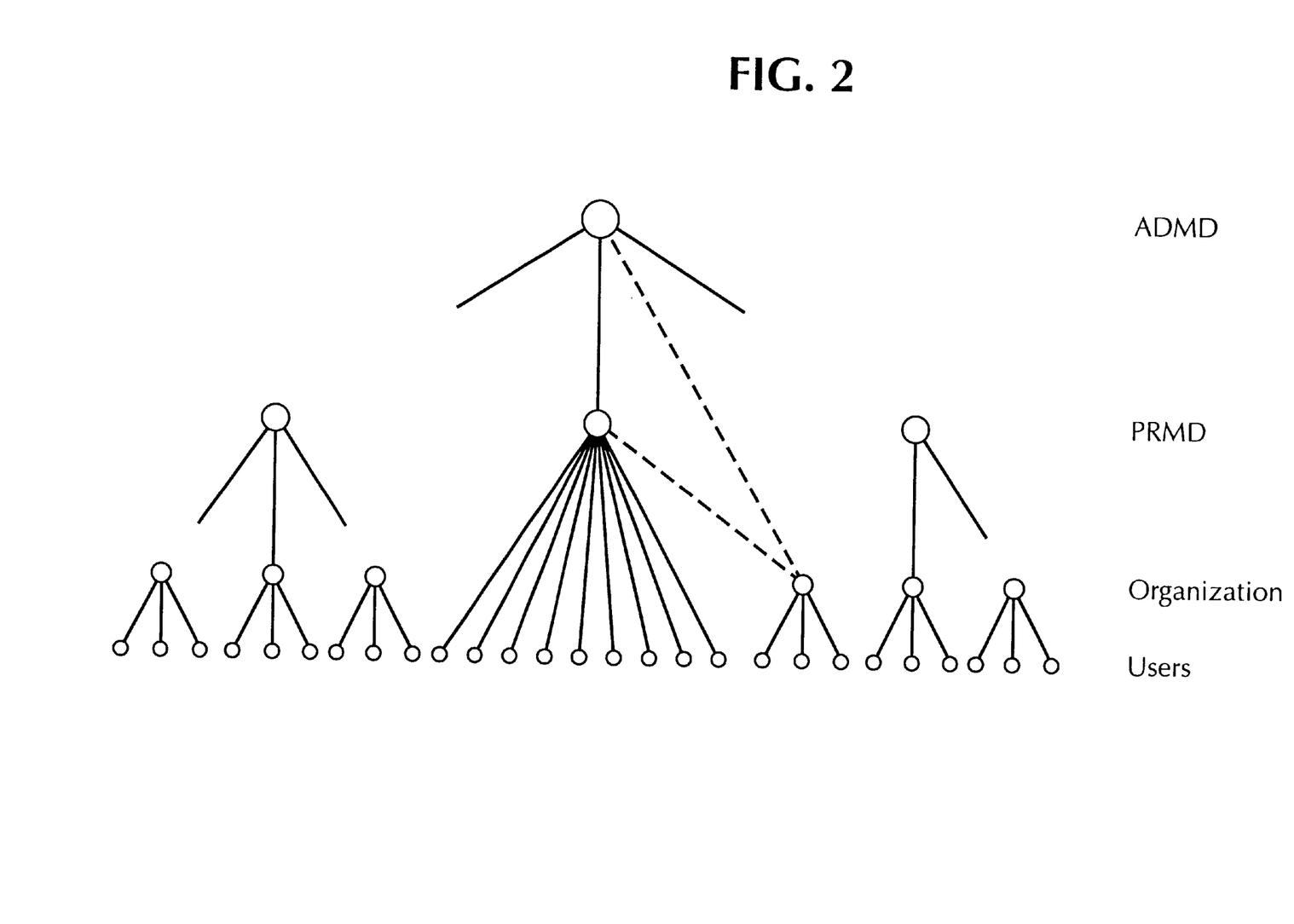
FIG. 2 is a diagrammatic representation of the X.400 addressing tree.

X.400 addressing is based on a hierarchial set of attributes, as shown in Table 1. These attributes function as nodes in the X.400 addressing tree, a portion of which is shown in FIG. 2. This is a framework whereby service is provided to a global population, while enabling each individual service point to retain a limited and manageable segment of the addressing tree.

TABLE 1

X.400 Addressing Attributes

| Field Type | Symbol |
|---|---|
| Country | C |
| Administration Domain Name (ADMD) | A |
| Private Domain Name (PRMD) | P |
| X.121 Address | X121 |

TABLE 1-continued

X.400 Addressing Attributes

| Field Type | Symbol |
|---|---|
| Numeric User ID | NUID |
| Terminal ID | TID |
| Organization | O |
| Organizational Unit 1 | OU1 |
| Organizational Unit 2 | OU2 |
| Organizational Unit 3 | OU3 |
| Organizational Unit 4 | OU4 |
| Surname | S |
| Given Name | G |
| Initial Name | I |
| Generation Qualifier | Q |
| Domain Defined Attribute | DDA |
| Domain Defined Attribute | DDA |
| Domain Defined Attribute | DDA |
| Domain Defined Attribute | DDA |

Users may be attached to any level of the scheme below the Country node. All of the attributes except the Country and Administration Domain Name ("ADMD") attributes are optional. Thus, for example, users may have only personal name attributes, ADMD, and Country. Alternatively, they may have attributes for Private Domain Name ("PRMD"), Organization, and so forth as well. In the theoretical X.400 tree, every user occupies the end of a unique branch from the root node. That is, X.400 users, both applications and humans, are located at the "leaf" nodes on the X.400 tree.

In message transfer, a message originates at a "leaf" node and travels up the originator's branch toward the trunk of the X.400 tree until an intersection with the recipient's branch is encountered. At that point, the message is transferred down the recipient's branch to the recipient. This is the main function of the X.400 Message Transfer System (MTS). The MTS is a set of X.400 computers operating as MTAs to route a specific message from the originator to the recipient(s). Thus, the nodes are intelligent decision points occupied by MTAs.

Figure 3:
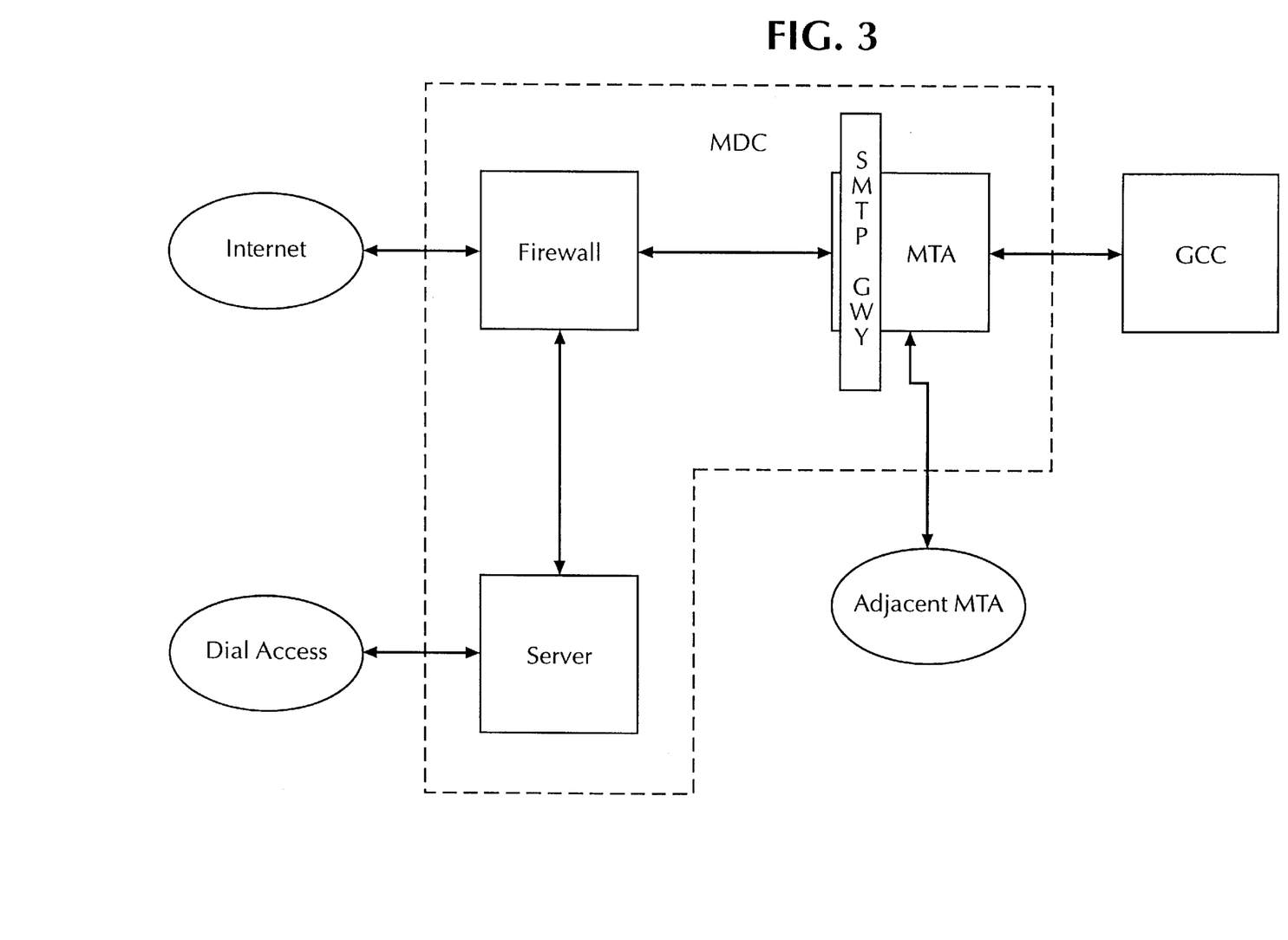
FIG. 3 is a block diagram showing the component parts of the Message Distribution Center.

The MDC consists of three basic subsystems: (i) the Message Transfer Agent (MTA); (ii) the firewall; and (iii) a MTA Message Store Server. FIG. 3 is a block diagram of the MDC.

The first subsystem of the MDC is a WindowsNT server, preferably a Compaq ProLiant 1600, running a commercial, off-the-shelf MTA software package on the WindowsNT Version 4 Operating System. The MTA software complies with International Telecommunications Union X.400 1992 standards and is capable of being backwards compatible to 1988 and 1984 X.400 standards. The MTA software shall also adhere to the International Standards Organization (the United Nations organization that coordinates national and commercial committees to formulate and agree on standards for trade and technology), and X.400 Request for Comment standards for messaging. The MTA shall also have a SMTP/MIME (Multi-purpose Internet Mail Extensions) Gateway Interface. The Messenger Workplace product developed by Infonet Services Corporation is the preferred MTA software for the MDC.

A gateway is a device or software process that enables two computer systems using different standards to cooperate with each other in communicating data. A gateway functions by identifying the service elements of each standard and translating each element of the message from the originating to the receiving side. A SMTP/MIME Gateway converts a message from SMTP format to X.400 format so that the message can be sent through the X.400 tree described above. On the recipient side, a SMTP/MIME Gateway converts the message from the X.400 format to the recipient's format so that the recipient's computer system can handle the message.

The second MDC subsystem is a WindowsNT server, preferably a Compaq ProLiant 800, running the firewall software. The firewall software is a commercial, off-the-shelf product that runs on the WindowsNT Version 4 Operating System and is capable of supporting a minimum of three network interface cards (NICs). (A network interface card is an integrated circuit board that connects directly to the data communication cable attached to a computer. NICs usually contain processors, memory, and software to relieve the main computer of the mundane tasks of network communication.) Additionally, the firewall software must be capable of deploying the Secure Service LAN concept. The Axent Eagle Raptor for NT, Version 6, is the preferred firewall software for the MDC.

A Secure Service LAN is a segment of the local area network that is removed from the backbone or secure portion of the network. Typically, a Secure Service LAN is an additional NIC off of a firewall. The Secure Service LAN provides a secure location for applications and mailboxes to reside. When a system includes a Secure Service LAN and a hacker gets into an application residing on the Secure Service LAN and "breaks out" of the application into the system's hardware, the amount of damage that can be done is limited because the backbone or secure portion of the network is isolated from the Secure Service LAN and protected by the firewall.

The third MDC subsystem is a WindowsNT server, preferably a Compaq ProLiant 1600, running a commercial, off-the-shelf MTA software package that runs on the WindowsNT Version 4 Operating System. This subsystem provides message store (X.400) and post office (Internet mail) services for e-mail users via Post Office Protocol Version 3 (POP3) software. Messages destined for an e-mail user are held in this subsystem until the user connects and requests delivery. This subsystem also accepts messages from the user and prepares them for the MTS. A modem bank is included in this subsystem to allow dial-in customer access to the POP3 software.

The POP3 software allows access to mail stored on the third MDC subsystem, described above, from a variety of client platforms. The methods for dial-in access may be one or more of the following: Internet access; analog modem (up to 33.6 Kbps); ISDN Primary Rate Interface (PRI); E1 line; T1 line. The MediaStore product from Infonet Software Solutions is the preferred POP3 software package.

The MTM consists of two software modules. An encoding module resides on the regional GCC and a decoding module resides on the MDC. A SC's domain is identical to the domain of the MDC operated by the service provider that provisioned the specific SC. This enables the global (public) X.400 network to route SC-terminated messages through the provisioning service provider's MDC. The MDC then routes the message to the appropriate GCC for delivery to the SC.

In SC-originated messages, the MTM software in the regional GCC performs the following functions: (i) changes the recipient address to include certain attributes of the address for the service provider's MDC, thereby forcing messages to be routed through the provisioning service provider's MDC; (ii) retains the attributes of the original recipient's address that were replaced with the MDC's address attributes; and (iii) provides a system in which the service provider can specify (a) the parameters by which the SC's registration is recognized and (b) the changes that are to be made to the recipient's address.

The MTM software in the MDC must perform the following: (i) reverse the modified address so that the original recipient's address is restored; (ii) modify the MTS Global Domain Identifier to match the domain of the MDC, satisfying any subsequent "P1 Checking" in the public networks; and (iii) modify the Message Trace Information to satisfy any subsequent P1 Checking in the public networks.

To prevent mail fraud and hacking, many service providers perform internal consistency checks within each message. When an inconsistency is found within a message, the message is canceled. The P1 protocol, formally referred to as the MTA transfer protocol, describes how two MTAs exchange messages. Message Trace Information is one of the P1 checking parameters, allowing a service provider to determine the status of message delivery within the Message Handling System. Message Trace Information includes the time, place and action performed on a message as it passes through an MTA. It provides a trail for consistency checking, debugging, and prevention of certain system anomalies.

To route SC-originated messages based on the originator's address rather than the recipient's address, the recipient's address must be converted based upon a particular X.400 attribute in the originator's address. When a SC-originated message moves through the regional GCC's MTM, the originator's address is examined and the MTM determines whether the originator's address matches any of the entries contained in a database loaded into the MTM. The database includes information relating to all SCs provisioned by service providers operating a MDC connected to the regional GCC. If the originator's address matches an entry in the database, the message is "encapsulated." That is, certain attributes of the original recipient's address are replaced with the corresponding attributes of the MDC operated by the service provider that provisioned the SC. The original recipient's address attributes are stored within the non-functional address fields ("Domain Defined Attribute" fields, discussed below) and the message is routed to the provisioning service provider's MDC based on the "encapsulating" address. At the MDC, the original recipient's address attributes are returned to their original position within the address fields and the message is routed accordingly.

Message encapsulation is carried out as follows: Each Originator/Recipient Name in the X.400 System carries the potential for a maximum of four Domain Defined Attributes ("DDAs"). A DDA contains a user-defined label (a DDA "Type"), to enable a routing application to recognize messages having the routing application's DDA, and a DDA "Value." The DDA Value is a field in which a maximum of 128 characters from the Printable String character set may be inserted by any system that requires them. The X.400 system is required to ignore the contents of the DDA Value when handling the message. The general purpose of these DDA Values is to enable messages to be sent between proprietary e-mail systems.

The MTM software in the regional GCC uses a DDA of the Type "MDC-MTM" to carry the original recipient's address attributes. Thus, the "DDA Type" will be "MDC-MTM" and the "DDA Value" will be the information required to restore the recipient address to its original configuration. Because the DDA Value is limited to 128 characters, this is the limit on information that can be stored in this field. The only pieces of information that need to be stored in the "MDC-MTM" DDA Value field are the original recipient's address attributes that were replaced with the corresponding address attributes of the provisioning service provider's MDC, i.e., the Country, ADMD, PRMD, and Organization Values.

Because the MTM operates as a MTA rather than a final delivery point, a complete match of address attributes is not required. This is because the routing scheme within the MTS works on the hierarchy of attributes. This routing scheme is analogous to sorting mail, where a bag in a central office is handled on the basis of country or city name, without regard for the street address. This method contrasts with other routing methods in which all address attributes must match. The original recipient's address attributes, other than those required for MTM encapsulation, can be left in place and they will not hamper the process of routing the message from the regional GCC's MTM to the MTM in the provisioning service provider's MDC.

As an example, Table 2 shows the result of MTM encapsulation of a SC-originated message.

TABLE 2

Results of MTM encapsulation

| Attribute Name | Original Recipient's X.400 Attributes | MTM Modified Attributes |
| --- | --- | --- |
| Country | NE | DE |
| ADMD | NederPost | DEPost |
| PRMD | TelePost | OrbDE |
| Organization | Schneider and Assoc. | MDC-MTM |
| Org Unit 1 | Bavaria | Bavaria |
| Org Unit 2 | Sales | Sales |
| Surname | Schwartz | Schwartz |
| Given Name | Ernst | Ernst |
| DDA | | //Schneider and Assoc./NE/NederPost/TelePost |

In this example, the Country, ADMD, PRMD, and Organization attributes of the original recipient have been replaced by the relevant address attributes of the service provider's MDC. The original information is stored in the "MDC-MTM" DDA. To guarantee that the allowable length of the "MDC-MTM" DDA Value is not exceeded by this information, the MTM module must be addressable with only the attributes Country, ADMD, PRMD, and Organization. The maximum cumulative number of characters allowed in these four fields is 99. When the five required slash marks are added, the maximum number of characters that might be included in the "MDC-MTM" DDA Value is 104, which is well within the maximum 128 character limit.

The conversion shown above is performed by the MTM in the regional GCC in accordance with the following algorithm:

```
If SC Originator Country is DE {
    Use MDC Country              DE
    Use MDC ADMD                 DEPost
    Use MDC PRMD                 OrbDE
    Use MTM Organization         MDC-MTM
    for SMTP recipients, use Gateway   INTERNET-ME
}.
```

The code associated with this algorithm can be executed anywhere in the data stream between the construction of the message and entry into the global X.400 system. Additionally, this algorithm can be used with any attribute contained in the originator's address. Thus, e.g., the algorithm could read "If SC Originator ADMD is XYZ . . . "

As a result of this conversion, the message will be routed to the service provider's MDC, where the MTA will transfer the message to the MTM. The MTM extracts the original recipient's address attributes from the "MDC-MTM" DDA Value and reconstructs the original recipient's address. The MTM strips away the regional GCC's Global Domain Identifier ("GDI") and replaces it with the GDI of the service provider's MDC. The MTM also removes the External Trace Information from the message, leaving only an external trace with the original time that the message entered the MTM at the GCC. These modifications avoid cancellation of the messages that would otherwise occur in certain commercial X.400 environments and preserve the illusion that the service provider's MDC is handling its own traffic without crossing national boundaries. The MTM then routes the message in accordance with the original recipient's address.

When a message is addressed in SMTP format, e.g., localpart@domain.com, the regional GCC converts the recipient's address to X.400 format prior to the message being routed to the regional GCC's MTM. This conversion is carried out by replacing the original recipient's address with the regional GCC's X.400 attributes and placing the original recipient's address in a DDA with the Type "DDA.XRFC-822." With the original recipient's address now in X.400 format, the message is handled in accordance with the above-described procedures, including MTM encapsulation for routing to the MDC.

The following operational scenarios illustrate the implementation of the present invention. These examples assume a SC provisioned by the service provider operating a MDC in Germany that is attached to a regional GCC in Italy. The relevant address attribute values are as follows:

TABLE 3

Attributes used for Examples 1 and 2

| | SC | German MDC | Regional GCC |
| --- | --- | --- | --- |
| Country | DE | DE | IT |
| ADMD (A) | TBD | TBD | Master400 |
| PRMD (P) | ORBDE | ORBDE | MCO |
| Organization | — | MDC-MTM | — |
| Surname (S) | SCTest2 | — | — |

EXAMPLE 1

The first operational scenario is for the German MDC to handle the inbound and outbound X.400 messages for a SC provisioned in its domain. This ensures the proper routing from the regional GCC in Italy to the German MDC.

In this example, a SC provisioned by the service provider operating the German MDC sends a message to a generic X.400 user in France with the following address:

C=FR
A=Atlas
P=OustNet
O=Le Chat Boutique
S=Andre
G=Jacques.

The message is transmitted from the SC to the appropriate satellite and back down to the appropriate GES. The message is then routed to the regional GCC in Italy. The regional GCC's MTM compares the originating SC's address to the MTM database entries and recognizes that the message was sent by a SC provisioned by the service provider operating the German MDC. The regional GCC's MTM retrieves the address of the provisioning, i.e., German, MDC and encapsulates the recipient's address by replacing the values contained in the recipient's Country, ADMD, PRMD, and Organization Value fields with the related attributes for the German MDC. The replaced attributes are stored in the "MDC-MTM" DDA Value field. Table 4 shows the results of this encapsulation.

TABLE 4

Results of MTM encapsulation on a SC-originated, X.400 message.

| Attribute Name | Original Recipient Attribute Values | MTM Modified Attribute Value |
| --- | --- | --- |
| Country | FR | DE |
| ADMD | ATLAS | TBD |
| PRMD | OuestNet | ORBDE |
| Organization | Le Chat Boutique | MTD-MTM |
| Surname | Andre | Andre |
| Given Name | Jacques | Jacques |
| DDA.MDC-MTM | — | //Le Chat Boutique/FR/Atlas/OuestNet |

The message is routed from the regional GCC's MTM to the regional. GCC's MTA, which adds the MTS ID, C=IT/A=Master400/P=MCO 99111213 3432 ef23, and leaves the following trace entry in the message:

C=IT/A=Master400/P=MCO 991112133432 (Nov. 12, 1999) 1:34:32 PM

Transferred.

The regional GCC's MTA then routes the message to the German MDC's MTA based on the encapsulating address. The German MDC's MTA routes the message to the German MDC's MTM. The German MDC's MTM reconstructs the intended recipient's address by removing the MDC's Country, ADMD, PRMD and Organization attribute values, retrieving the corresponding attribute values for the intended recipient's address from the MDC-MTM DDA Value field and replacing these values in their original place in the address configuration.

The German MDC's MTM modifies the MTS Identifier and Trace so that they become, respectively:

C=DE/A=TBD/P=ORBDE 99111213 3432 ef23

C=DE/A=TBD/P=ORBDE 991112133432 (Nov. 12,1999) 1:34:32 PM

Transferred.

The message is now transferred back to the MDC's MTA, from which it is transferred to the normal MTS for delivery to the intended recipient.

EXAMPLE 2

This scenario involves an Internet (SMTP) message addressed to JAndre@KChat.com.fr from a SC provisioned by the service provider operating the German MDC. The message is sent from the SC to the appropriate satellite, which transmits the message to the GES. The message is routed from the GES to the regional GCC in Italy, to which the GES is connected. The regional GCC converts the recipient address into X.400 format with the following address attributes of the regional GCC:

C=IT

A=Master400

P=MCO

O=INTERNET

DDA.XRFC-822=JAndre(a)KChat.com.

After this conversion, the message is routed to the regional GCC's MTM. Similar to the method described in Example 1, the regional GCC's MTM compares the originating SC's address to the MTM database entries and recognizes that the message was sent by a SC provisioned by the service provider operating the German MDC. The regional GCC's MTM retrieves the address of the provisioning, i.e., German, MDC and encapsulates the recipient's address by replacing the information contained in the original recipient's Country, ADMD, PRMD, and Organization Value fields (as converted above) with the related attributes for the German MDC. The replaced attributes are stored in the "MDC-MTM" DDA Value field. Table 5 shows the results of this encapsulation.

TABLE 5

Results of MTM encapsulation on a SC-originated, SMTP message.

| Attribute Name | Recipient Attribute Value in X.400 format | MTM Modified Attribute Value |
| --- | --- | --- |
| Country | IT | DE |
| ADMD | Master400 | ORBDE |
| PRMD | MCO | TBD |
| Organization | INTERNET | MDC-MTM |
| DDA.MDC-MTM | — | //INTERNET/IT/Master400/MCO |
| DDA.XRFC-822 | JAndre(a)KChat.com.fr | JAndre(a)KChat.com.fr |

The message is routed from the regional GCC's MTM to the regional GCC's MTA, which adds the MTS ID, C=IT/A=Master400/P=MCO 99111213 3432 ef23, and leaves the following trace entry in the message:

C=IT/A=Master400/P=MCO 991112133432 (Nov. 12, 1999) 1:34:32 PM

Transferred.

The regional GCC's MTA then routes the message to the German MDC's MTA based on the encapsulating address. The German MDC's MTA routes the message to the German MDC's MTM, where the address is converted to the following:

C=DE

A=TBD

P=ORBDE

O=INTERNET

DDA.RFC-822=JAndre(a)KChat.com.fr.

The German MDC's MTM modifies the MTS Identifier and Trace so that they become, respectively:

C=DE/A=TBD/P=ORBDE 99111213 3432 ef23

C=DE/A=TBD/P=ORBDE 991112133432 (Nov. 12, 1999) 1:34:32 PM

Transferred.

The German MDC's MTM routes the message back to the German MDC's MTA, which routes the message to the German MDC's MIME ateway as a result of the Organization Value being INTERNET. The MIME gateway converts the message to SMTP format with the recipient address of Jandre@KChat.com.fr. The message is then sent to the recipient via the Internet.

EXAMPLE 3

The next scenario involves a message sent by a generic X.400 user in France to a SC provisioned by a service provider operating the German MDC. The message enters the German MDC via the MDC's locally registered ADMD, which is identical to the ADMD Value for all SCs provisioned by the service provider operating the German MDC. The message is routed from the MDC to the regional GCC in Italy via (in the preferred embodiment) the dedicated frame relay connection connecting the German MDC to the regional GCC. From the regional GCC, the message is routed to a GES, which transmits the message to the appropriate satellite. The satellite completes the message delivery by transmitting the message to the SC.

EXAMPLE 4

The next scenario involves a SC-terminated Internet (SMTP) message and is procedurally similar to Example 3. In this example, a generic user in France sends a message to a SC that is provisioned by the service provider operating the German MDC. The message is delivered from the generic user in France as a SMTP message over the Internet. The message is routed to the German MDC by means of the MDC's unique registered domain name, which is identical to the domain name for all SCs provisioned by the service provider operating the German MDC, via the German MDC's Internet Service Provider. The message is then transmitted to the regional GCC in Italy over the dedicated frame relay connecting the German MDC and the regional GCC. From the regional GCC, the message is routed to a GES, which transmits the message to the appropriate satellite. The satellite transmits the message to the SC.

While a preferred embodiment of the invention has been described and illustrated, it is to be understood that further modifications thereof may be made within the scope of the appended claims without departing from the spirit of the invention.

What is claimed is:

1. A method for routing an electronic message from a subscriber communicator to an intended recipient via satellite, comprising the steps of:
   including an indicia corresponding to a subscriber communicator with an electronic message;
   communicating said electronic message from said subscriber communicator to a gateway control center via satellite;
   receiving said electronic message that originated from said subscriber communicator at said gateway control center;
   comparing at said gateway control center said indicia included with said electronic message and corresponding to said subscriber communicator with a statically stored subscriber communicator indicia to identify a service provider servicing said subscriber communicator to which said subscriber communicator indicia included with the electronic message corresponds;
   encoding the electronic message so as to route it to a system of said identified service provider to which the subscriber communicator indicia included with the electronic message corresponds;
   transmitting the electronic message to said system of said service provider;
   decoding the electronic message so as to route it to the intended recipient; and
   routing said electronic message from said system of said service provider to the intended recipient, wherein said intended recipient could be serviced by a second service provider that is different from said service provider of said subscriber communicator.

2. The method of claim 1, wherein said step of communicating the electronic message from said subscriber communicator proceeds through at least one intermediary ground-based transceiver.

3. The method of claim 1, wherein said step of communicating the electronic message from the subscriber communicator further comprises transmitting said electronic message from said satellite to a gateway earth station.

4. The method of claim 1, wherein said electronic message has an address field containing a recipient address data, said data indicative of said intended recipient of said electronic message. and a value field, and wherein said encoding step further comprises replacing at least a portion of said recipient address data with address data indicative of said system of a service provider servicing said subscriber communicator and storing the replaced portion of the recipient address data in said value field.

5. The method of claim 4, wherein said decoding step further comprises replacing said service provider address data with said recipient address data stored in said value field.

6. The method of claim 1, wherein said routing step further comprises transmitting said electronic message from said system of said service provider via a network of connected computers.

7. The method of claim 6, wherein said network of connected computers is Internet.

8. The method of claim 6, wherein at least one computer is said network of connected computers is a Message Transfer System.

9. The method of claim 1, wherein said gateway-control center comprises a message distribution center transfer module.

10. The method of claim 1, wherein said service provider's system comprises a plurality of computer servers.

11. The method of claim 10, wherein a message transfer agent software is operated on at least one computer server of said plurality of computer servers of the service provider, said message transfer agent software comprising at least partially a commercial, off-the-shelf message transfer agent software package.

12. The method of claim 11, wherein said message transfer agent software is a commercial, off-the-shelf message transfer agent software package.

13. The method of claim 11, wherein a firewall software is operated on another computer server of said plurality of computer servers of the service provider, wherein said another computer server is different from said computer server on which said message transfer agent software is operated.

14. The method of claim 11, wherein said transfer agent software package includes post office protocol version 3 software, for providing message store and post office services.

15. The method of claim 14, wherein said service provider provides access to its message store and post office services to others via Internet.

16. The method of claim 14, wherein said service provider provides access to its message store and post office services to others via an analog modem.

17. The method of claim 14, wherein said service provider provides access to its message store and post office services to others via a cable modem.

18. The method of claim 14, wherein said service provider provides access to its message store and post office services to others via an ISDN interface.

19. The method of claim 14, wherein said service provider provides access to its message store and post office services to others via an E1 line.

20. The method of claim 14, wherein said service provider provides access to its message store and post office services to others via a T1 line.

21. The method of claim 10, wherein a firewall software is operated on at least one computer server of said plurality of computer servers of the service provider, said firewall software package comprising at least partially a commercial, off-the-shelf firewall software package.

22. The method of claim 21, wherein said firewall software is a commercial, off-the-shelf firewall software package.

23. The method of claim 22, wherein said commercial, off-the-shelf firewall software package deploys a Secure Service LAN.

24. The method of claim 1, further comprising the steps of including indicia corresponding to said subscriber communicator with a second electronic message originating with said recipient of a prior electronic transmission from said subscriber communicator;

transmitting said second electronic message to the system of the service provider that services said subscriber communicator;

routing said second electronic message from said system of the service provider to the gateway control center;

communicating said second electronic message from said gateway control center to said subscriber communicator via satellite.

25. The method of claim 24, wherein said step of communicating the second electronic message from said gateway control center to said subscriber communicator further comprises transmitting said second electronic message from said gateway control center to a gateway earth station for transmission via satellite.

26. The method of claim 24, wherein said step of communicating the second electronic message from said gateway control center to said subscriber communicator proceeds through at least one intermediary ground-based transceiver.

* * * * *